United States Patent
Bradford et al.

(10) Patent No.: US 8,380,121 B2
(45) Date of Patent: Feb. 19, 2013

(54) LEARNING OUTCOME MANAGER

(75) Inventors: Sarah Bradford, Denver, CO (US); Matthew Schnittman, Highlands Ranch, CO (US)

(73) Assignee: Ecollege.com, Denver, CO (US)

( * ) Notice: Subject to any disclaimer, the term of this patent is extended or adjusted under 35 U.S.C. 154(b) by 862 days.

(21) Appl. No.: 11/160,487

(22) Filed: Jun. 27, 2005

(65) Prior Publication Data

US 2006/0147890 A1 Jul. 6, 2006

Related U.S. Application Data

(60) Provisional application No. 60/593,340, filed on Jan. 6, 2005.

(51) Int. Cl.
G09B 3/00 (2006.01)
(52) U.S. Cl. .......................... 434/350; 434/322; 434/323
(58) Field of Classification Search .................. 434/118, 434/322, 323, 350
See application file for complete search history.

(56) References Cited

U.S. PATENT DOCUMENTS

| | | | | |
|---|---|---|---|---|
| 4,804,328 | A * | 2/1989 | Barrabee | 434/308 |
| 5,339,826 | A * | 8/1994 | Schmidt et al. | 600/544 |
| 6,149,441 | A * | 11/2000 | Pellegrino et al. | 434/322 |
| 6,496,681 | B1 * | 12/2002 | Linton | 434/350 |
| 6,616,455 | B1 * | 9/2003 | Allen, Sr. | 434/245 |
| 6,652,287 | B1 * | 11/2003 | Strub et al. | 434/365 |
| 6,679,703 | B2 * | 1/2004 | Alling | 434/219 |
| 6,688,888 | B1 * | 2/2004 | Ho et al. | 434/322 |
| 2001/0018178 | A1 * | 8/2001 | Siefert | 434/322 |
| 2002/0133493 | A1 * | 9/2002 | Mascarenhas | 707/10 |
| 2002/0142278 | A1 * | 10/2002 | Whitehurst et al. | 434/350 |
| 2003/0017442 | A1 * | 1/2003 | Tudor et al. | 434/322 |
| 2003/0074559 | A1 * | 4/2003 | Riggs | 713/168 |
| 2003/0113697 | A1 * | 6/2003 | Plescia | 434/322 |
| 2003/0129575 | A1 * | 7/2003 | L'Allier et al. | 434/362 |
| 2003/0134261 | A1 * | 7/2003 | Jennen et al. | 434/354 |
| 2003/0163784 | A1 * | 8/2003 | Daniel et al. | 715/514 |
| 2003/0228563 | A1 * | 12/2003 | Sang et al. | 434/323 |
| 2003/0236792 | A1 * | 12/2003 | Mangerie et al. | 707/100 |
| 2004/0014019 | A1 * | 1/2004 | Phalp et al. | 434/350 |
| 2004/0110120 | A1 * | 6/2004 | Ho et al. | 434/350 |
| 2004/0152064 | A1 * | 8/2004 | Raniere | 434/350 |
| 2004/0161734 | A1 * | 8/2004 | Knutson | 434/335 |
| 2004/0214152 | A1 * | 10/2004 | Hoyashita et al. | 434/350 |
| 2005/0014121 | A1 * | 1/2005 | Eck et al. | 434/350 |
| 2005/0026131 | A1 * | 2/2005 | Elzinga et al. | 434/365 |
| 2005/0100875 | A1 * | 5/2005 | Best et al. | 434/362 |
| 2005/0102322 | A1 * | 5/2005 | Bagley et al. | 707/104.1 |
| 2005/0114160 | A1 * | 5/2005 | Boehme et al. | 705/1 |
| 2006/0115801 | A1 * | 6/2006 | Ganley et al. | 434/219 |
| 2006/0172274 | A1 * | 8/2006 | Nolasco | 434/350 |
| 2007/0100829 | A1 * | 5/2007 | Allen et al. | 707/9 |

* cited by examiner

*Primary Examiner* — Xuan Thai
*Assistant Examiner* — Bruk Gebremichael
(74) *Attorney, Agent, or Firm* — Snell & Wilmer L.L.P.

(57) ABSTRACT

The invention provides a system and method for efficiently measuring and reporting performance relative to established learning outcomes for students, professors, classes, courses and programs. The invention provides an evidence-based approach to measuring student achievement and increasing educator accountability. Using associations between learning content, assessment content, and learning outcomes, the invention facilitates measurement of student achievement, content effectiveness, and teaching effectiveness, through reporting of student, class, teacher, course, and institution performance relative to set outcomes in an on-line educational environment.

27 Claims, 4 Drawing Sheets

LEARNING OUTCOME MANAGER

CROSS-REFERENCE TO RELATED APPLICATIONS

This application claims benefit from, and priority to, U.S. Provisional Patent Application Ser. No. 60/593,340 filed Jan. 6, 2005, which is hereby incorporated by reference in its entirety.

FIELD OF INVENTION

The present invention generally relates to measuring performance in an on-line educational environment.

BACKGROUND OF INVENTION

An increasing number of students are participating in distance learning such as, for example, educational courses over the Internet. These courses often contain various types of multi-media or interactive teaching tools in addition to traditional lectures, assignments, and exams. As established institutions offer more on-line educational institutions and on-line courses, administrators and educators are demanding more efficient and convenient course management tools. While known course management systems provide for reporting of student performance relative to assessment content, such systems typically do not adequately enable institutions to demonstrate student achievement or teaching effectiveness in terms of standardized learning outcomes or learning objectives, i.e., by other than mere GPA.

The No Child Left Behind Act requires each state to establish standards for K-12 knowledge and skill sets in core subject areas and to provide student achievement data in these areas. In higher education, standards defining achievement or acquisition of these knowledge and skill sets (referred to herein as "learning outcomes") are typically created locally by each school. Moreover, accreditation agencies encourage that institutions establish learning outcome accountability measures, i.e. that learning outcomes are adequately measurable and that the outcomes are reported.

Accreditation is critical to institutions since federal and state grants and loans as well as company tuition reimbursement programs typically require that a college, university, or program be accredited. Similarly, state governments often require accreditation for program graduates to sit for state licensure examinations or to be eligible for state employment. On-line students also benefit from obtaining measurable results from participating in a course or program.

Accrediting agencies impose certain requirements on institutions seeking to gain accreditation. The following exemplary requirements are found in the Educational Effectiveness Indicators section of the Western Association of Schools and Colleges ("WASC") Manual of Accreditation:

Have formal learning outcomes been developed?
  Where are these learning outcomes published? (Please specify)
Other than GPA, what measures/indicators are used to determine that graduates have achieved the stated outcomes for the degree? (e.g., capstone course, portfolio review, licensure exam)
Date of last program review for this degree.
  Additional specific guidelines and requirements for distance programs have been developed in a joint effort by eight regional accrediting agencies and documented in the Interregional Guidelines for Electronically Offered Degree and Certificate Programs, 2002.

Student achievement is typically reported only as a single course letter grade, rather than as scores associated with individual learning outcomes. In other words, conventional achievement tracking and reporting systems typically manage content only at the learning content level, i.e. these systems do not tie individual examination questions back to defined learning outcomes. Furthermore, conventional systems provide little or no capability to evaluate aggregate student performance relative to target learning outcomes.

Accordingly there is a need for a system and method for efficiently measuring and reporting performance for students, professors, classes, course sections, courses, or programs over extended periods of time based on established learning outcomes for purposes of accreditation review, along with observing trends and identifying areas for improvement or concern.

SUMMARY OF INVENTION

The invention provides a Learning Outcome Manager (LOM) system including various user interfaces for reporting student performance relative to established learning outcomes. The LOM includes a comprehensive toolset that enables an evidence-based approach to measuring student achievement. The functionality of the LOM supports educators with tools to increase accountability for teaching effectiveness and to address accrediting agency guidelines such as the WASC Educational Effectiveness Indicators. With the LOM, student achievement may be observed and reported based on various learning outcomes, rather than on a mere letter grade. For example, a detailed transcript generated by the LOM allows employers to see how applicants performed in individual skill and knowledge sets rather than merely in courses as a whole. Similarly, in various embodiments, the LOM includes or cooperates with a portfolio feature providing users with a digital collection of student work that is used to demonstrate a student's mastery of learning objectives. The LOM facilitates tracking and reporting of these learning outcomes.

The invention associates learning and assessment content with pre-defined learning outcomes through content metadata in a content manager system. A student is assessed in various mediums that address selected learning outcomes. The LOM records and evaluates student responses to the assessment content. The instructor or administrator may then generate reports to determine the level of each student's understanding for each learning outcome and to address student or course weaknesses. LOM generated performance reports may be used to assess individual student performance, class performance to identify deficient content, or inter-class performance to compare teaching effectiveness of different instructors.

The LOM also allows instructors to provide timely remedial content and instruction for particular students or for an entire class based on performance relative to a given outcome. The LOM further facilitates "gap analysis" by allowing instructors to gage alignment of their content with standardized learning outcomes. This may be accomplished by reporting an aggregate level of comprehension or mastery achieved relative to learning outcomes. Administrators may also generate reports to evaluate how well learning outcomes are being taught at a course, section, program or institution level.

The LOM may also be configured to record the time spent by student per learning and/or assessment content item and per learning outcome. This time data provides an improved understanding of student, class, and instructor time allocations relative to the learning outcomes. In addition, by tracking the student time spent pursuing each outcome, both in the learning and assessment phases, educators and administrators can more easily show accreditation bodies that particular learning outcomes are being met and can more easily predict and monitor the time required to master a particular outcome. Administrators can use the LOM to generate reports to accrediting bodies to show how they are monitoring, assessing, and improving their programs. In K-12 institutions, administrators may monitor student performance to ensure that students are adequately prepared for standardized testing. The LOM may store historic data to provide trend analysis and predictive modeling capabilities.

One benefit of the LOM over conventional self-paced or "gateway" learning systems and other on-line learning systems is that the aggregate data gathered and stored by the LOM may be used to show overall trends per student, class, course, program, section, professor, school, or district. At the student level, the LOM measures a student's performance relative to course outcomes. At the course level, the LOM assesses instructor performance, identifies weak content areas in a course and monitors improvement over time. At the program level, the LOM facilitates the analysis of program-level outcomes. The LOM shows specific content and student performance or activities correlated with specific learning outcomes. The LOM is particularly helpful in quantifying the higher-level, more abstract learning outcomes as a function of lower-level, more readily measurable learning outcomes.

BRIEF DESCRIPTION OF THE DRAWINGS

Additional aspects of the invention will become evident upon reviewing the non-limiting embodiments described in the specification and the claims taken in conjunction with the accompanying figures, wherein like reference numerals denote like elements.

DETAILED DESCRIPTION

While these exemplary embodiments are described in sufficient detail to enable those skilled in the art to practice the invention, it should be understood that other embodiments may be realized and that logical and mechanical changes may be made without departing from the spirit and scope of the invention. Thus, the detailed description herein is presented for purposes of illustration only and not of limitation. For example, any steps recited in any of the method or process descriptions may be executed in any order and are not limited to any order presented.

An LOM system according to the present invention is any system that associates learning and/or assessment content with learning outcomes (e.g., standardized learning outcomes) to facilitate the evaluation of performance relative to those learning outcomes at various levels. "Learning outcomes," as used herein, includes, for example, a unit of measure or standard referring to the understanding or acquisition of defined knowledge or skill sets. In one embodiment, learning outcomes include comprehension of a learning content item, acquisition of a standardized skill, mastery of a standardized learning objective and the like.

"Content" includes learning content. Learning content is any information or materials provided to the student such as, for example, a lecture, outline, threaded discussion, interactive instruction, exercise and/or materials created in conformance with e-Learning Industry standards such as those established by The Aviation Industry CBT (Computer-Based Training) Committee ("AICC"), Institute of Electrical and Electronics Engineers ("IEEE"), and the like. "Content" can also refer to assessment content that is intended to test a student based on performance or understanding relative to learning content or other concepts. An assessment content item includes an assignment, exam, quiz, skill test, journal entry, participation in a threaded discussion or other interaction in the course by which student performance is assessed. Individual content items may address multiple learning outcomes.

As used herein, the terms "user," "instructor," "student," "administrator," "educator," "teaching assistant," "institution," "participant," or "client" may be used interchangeably with each other, and each shall mean any person, entity, machine, hardware, software or business. Varying levels of system access may be granted based on various user role types. For example, an instructor role type may have full access to create, select, and modify learning outcomes and associated content while a lower level administrative role type may have access only to audit or view LOM generated reports.

Figure 1:
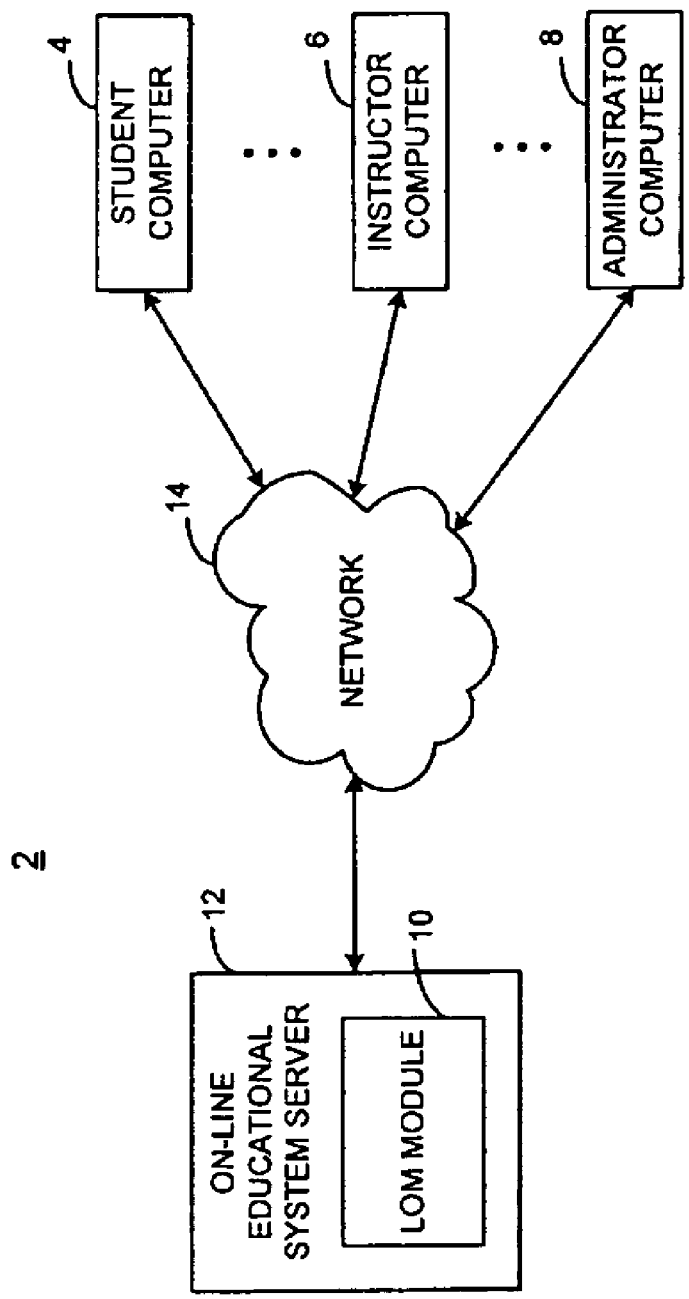
FIG. 1 is a diagram illustrating an exemplary LOM system network configuration in accordance with the present invention.

Turning now to the drawings, FIG. 1 is a diagram illustrating an exemplary LOM network configuration 2 for delivering on-line educational courses consistent with the present invention. Network configuration 2 includes a student computer 4, instructor computer 6 and an administrator computer 8 connected via a network 14 to an on-line educational system server 12 hosting an LOM module 10. An instructor at instructor computer 6 and a student at student computer 4 interact with each other and with on-line educational system server 12 via network 14. Examples of on-line educational system server 12 and of a system for delivering courses on-line are described in U.S. Pat. No. 6,470,171, which is hereby incorporated by reference.

In one embodiment, LOM module 10 incorporates three subsystems: a content manager, item analysis system, and a historic data warehouse. The content manager provides the ability to associate a particular learning outcome with a piece of content using metadata. The content manager stores content at a central level for access by multiple educators allowing content to be edited and updated substantially uniformly and shared across courses. Users may choose to create and store their own content, reference shared content, or download a local copy of the content.

The item analysis system provides the ability to analyze student performance based on responses to assessment content and to statistically measure the inherent validity of the questions. The historic data warehouse facilitates the analysis of student performance relative to assessment content and learning outcomes over time, as well as the time spent on such content and outcomes by students. Users may perform ad hoc queries to understand the impact of different variables on student performance. Aggregate historic data reveals trends and enables data-driven decision making and predictive modeling by administrators and instructors. Predictive modeling informs strategic decisions about program growth, faculty effectiveness, student retention, and program success.

Thus, LOM module 10 allows institutions to create various content items, associate these content items with various learning outcomes, and report upon student performance based on these learning outcomes over various periods of time.

Exemplary computers 4, 6, and 8 include personal computers, laptops, notebooks, hand held computers, set-top boxes, cellular telephones, and the like. In an embodiment, on-line educational system server 12 or another remote computer hosts LOM module 10. Alternatively, LOM module 10 may be implemented locally as computer software modules loaded onto a client computer such as instructor computer 6 or administrator computer 8.

As will be appreciated by one of ordinary skill in the art, the present invention may be embodied as a customization of an existing system, an add-on product, upgraded software, a stand alone system, a distributed system, a method, a data processing system, a device for data processing, and/or a computer program product. Accordingly, the present invention may take the form of an entirely software embodiment, an entirely hardware embodiment, or an embodiment combining aspects of both software and hardware. Furthermore, the present invention may take the form of a computer program product on a computer-readable storage medium having computer-readable program code means embodied in the storage medium. Any suitable computer-readable storage medium may be utilized, including hard disks, CD-ROM, optical storage devices, magnetic storage devices, and/or the like.

The various system components discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: course data; content data; institution data; and/or like data useful in the operation of the present invention. As those skilled in the art will appreciate, a user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. Computers 4, 6, and 8 can be in a home or educational institution environment with access to a network. In an exemplary embodiment, access is through a network or the Internet through a commercially-available web-browser software package.

As used herein, the term "network" 14 shall include any electronic communications means which incorporates both hardware and software components of such. Communication among the parties in accordance with the present invention may be accomplished through any suitable communication channels, such as, for example, a telephone network, an extranet, an intranet, Internet, point of interaction device, personal digital assistant (e.g., Palm Pilot®), cellular phone, kiosk, on-line communications, satellite communications, off-line communications, wireless communications, transponder communications, local area network (LAN), wide area network (WAN), networked or linked devices, keyboard, mouse and/or any suitable communication or data input modality. The invention may be implemented with TCP/IP communications protocols or with IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system components may be independently, separately or collectively suitably coupled to network 14 via data links which includes, for example, a connection to an Internet Service Provider (ISP) over a local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that network 14 may be implemented as any type of network, such as, for example, an interactive television (ITV) network. Moreover, the system contemplates the use, access, viewing, copying, or distribution of any information, goods or services over any network having similar functionality described herein. As used herein, "transmit" may include sending electronic data from one system component to another over a network connection. Additionally, as used herein, "data" may include encompassing information such as commands, queries, files, data for storage, and the like in digital or any other form. The invention contemplates uses in association with web services, utility computing, pervasive and individualized computing, security and identity solutions, autonomic computing, commodity computing, mobility and wireless solutions, open source, biometrics, grid computing and/or mesh computing.

Any databases discussed herein, such as the data warehouse, may include relational, hierarchical, graphical, or object-oriented structure and/or any other database configurations. Common database products that may be used to implement the databases include DB2 by IBM (White Plains, N.Y.), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the present invention, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary data can be stored in a storage space associated with a data set. The BLOB method may store data sets as ungrouped data elements formatted as a block of binary data via a fixed memory offset using fixed storage allocation, circular queue techniques, or best practices with respect to memory management (e.g., paged memory, least recently used, etc.). By using BLOB methods, the ability to store various data sets that have different formats facilitates the storage of data associated with the financial transaction instrument by multiple and unrelated owners of the data sets. For example, a first data set which may be stored may be provided by a first party, a second data set which may be stored may be provided by an unrelated second party, and yet a third data set which may be stored, may be provided by a third party unrelated to the first and second party. Each of these three exemplary data sets may contain different information that is stored using different data storage formats and/or techniques. Further, each data set may contain subsets of data that also may be distinct from other subsets.

As stated above, in various embodiments of the present invention, the data can be stored without regard to a common format. However, in one exemplary embodiment of the present invention, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header," "header," "trailer," or "status," herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets. Furthermore, the security information may restrict/permit only certain actions such as accessing, copying, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

One skilled in the art will also appreciate that, for security reasons, any databases, systems, devices, servers or other components of the present invention may consist of any combination thereof at a single location or at multiple locations, wherein each database or system includes any of various suitable security features, such as firewalls, access codes, encryption, decryption, compression, decompression, and/or the like.

The computing unit of the web client may be further equipped with an Internet browser connected to the Internet or an intranet using standard dial-up, cable, DSL or any other Internet protocol known in the art. Data transactions originating at a web client may pass through a firewall in order to prevent unauthorized access from users of other networks. Further, additional firewalls may be deployed between various system components to further enhance security.

Firewalls may include any hardware and/or software suitably configured to protect system components and/or enterprise computing resources from users of other networks. Further, a firewall may be configured to limit or restrict access to various systems and components behind the firewall for web clients connecting through a web server. Firewalls may reside in varying configurations including Stateful Inspection, Proxy based and Packet Filtering among others. Firewall may be integrated within a web server or any other system components or may further reside as a separate entity.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, components such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

The present invention may be described herein in terms of user views, optional selections and various processing steps. It should be appreciated that any of these may be realized by any number of hardware and/or software components configured to perform the specified functions. For example, the present invention may employ various integrated circuit components, e.g., memory elements, processing elements, logic elements, look-up tables, and the like, which may carry out a variety of functions under the control of one or more microprocessors or other control devices. Similarly, the software elements of the present invention may be implemented with any programming or scripting language such as C, C++, Macromedia Cold Fusion, Microsoft Active Server Pages, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the present invention may employ any number of conventional techniques for data transmission, signaling, data processing, network control, and the like. Still further, the invention could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley & Sons (second edition, 1995); (2) "Java Cryptography" by Jonathan Knudson, published by O'Reilly & Associates (1998); (3) "Cryptography & Network Security: Principles & Practice" by William Stallings, published by Prentice Hall; all of which are hereby incorporated by reference.

Computer program instructions may be loaded onto a general purpose computer, special purpose computer, or other programmable data processing apparatus to produce a machine, such that the instructions that execute on the computer or other programmable data processing apparatus create means for implementing the described functions and features. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions of the present invention.

Any steps or functions described herein can be implemented by either special purpose hardware-based computer systems which perform the specified functions or steps, or suitable combinations of special purpose hardware and computer instructions. Further, illustrations of the process flows and the descriptions thereof may make reference to user windows, web pages, websites, web forms, prompts, etc. Practitioners will appreciate that the steps described herein may comprise in any number of configurations including the use of windows, web pages, web forms, popup windows, prompts and the like. It should be further appreciated that the multiple steps as illustrated and described may be combined into a single step but have been expanded for the sake of simplicity. In other cases, steps illustrated and described as single process steps may be separated into multiple steps but have been combined for simplicity.

Figure 2:
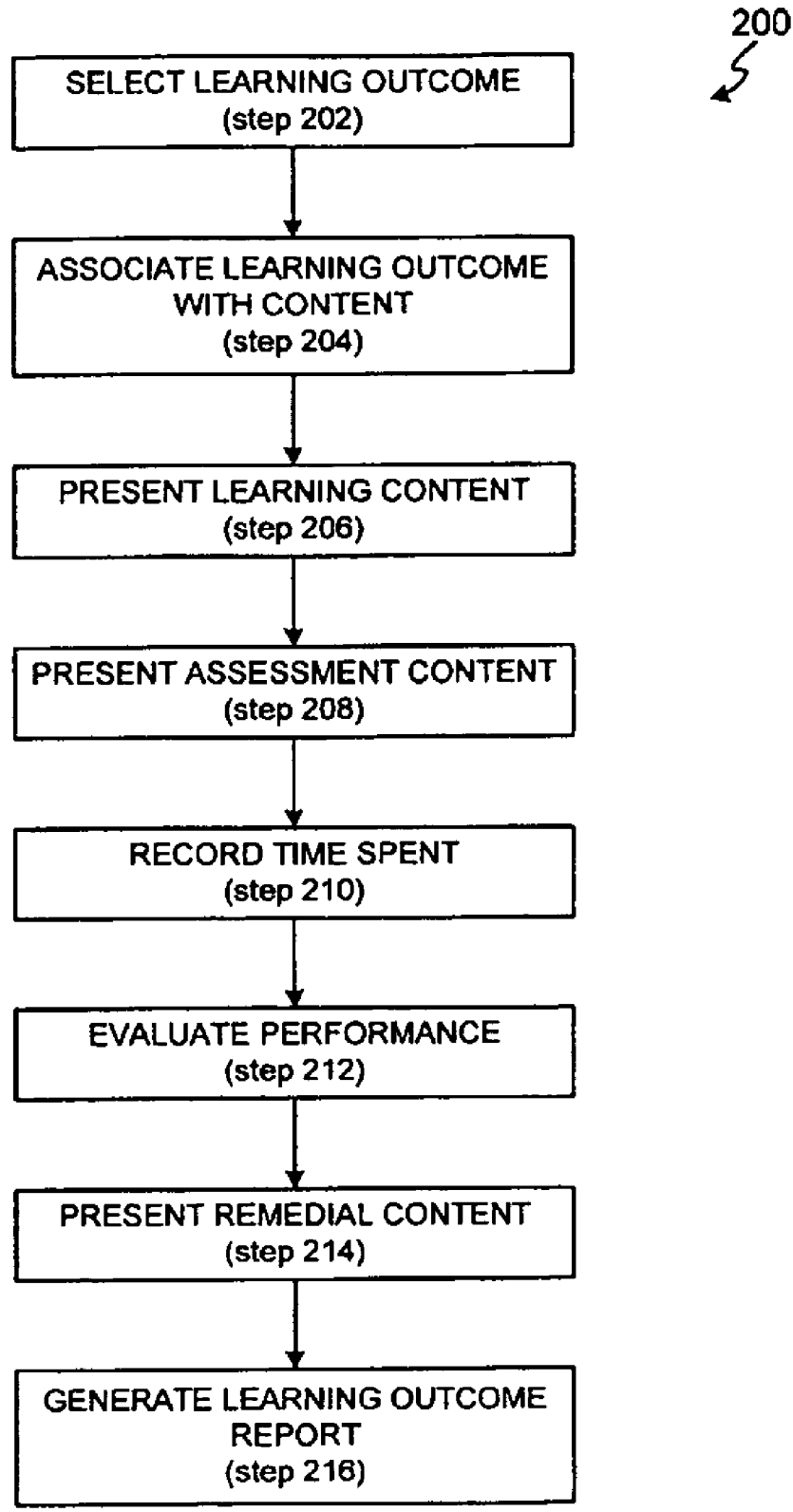
FIG. 2 is a flow diagram illustrating an exemplary LOM system process in accordance with the present invention.

Turning now to FIG. 2, an exemplary LOM method flow 200 is shown in accordance with an embodiment of the present invention. Initially, an authorized user (e.g., instructor) selects a desired learning outcome (step 202) from a central standards database or from a locally generated set of learning outcomes.

In order to generate meaningful reports, it is helpful if content authors within a college or program all use the same set of learning outcomes. Therefore, it may be desirable that system administrators or other authorized users establish the learning outcomes for a course or the learning outcomes to be available to content authors and instructors. For example, an administrator may upload files containing a learning outcomes list or may select outcomes from a standards database. There are several companies in the marketplace that maintain databases and indexes of state standards required by the No Child Left Behind Act and other individual state standards. One such learning outcome index or hierarchy is PLATO® Orion Standards & Curriculum Integrator available from Plato Learning Inc. of Bloomington, Minn. The purpose of such indexes is to associate one state's standards with another state's standards and to facilitate publisher content retrieval. Accordingly, publishers do not have to map their content to each state, but rather once to the index. For example, a K-12 administrator may import standards and learning outcomes from one of these existing companies' indexes. During content creation, appropriate metadata fields may be populated with the standards from one of these databases or indexes. Similarly, the LOM may be periodically synchronized with such databases to obtain updates and changes to such standards.

In an embodiment, an instructor or course developer view displays a hierarchy of learning outcomes that are available for selection or association with content items. Available or selected items may be organized, for example, in a series of drop boxes or menus. Outcomes and content items may be searchable, arrangable, and selectable by outcome, content, course, author, source, application, unit, user, course node, alphabetical order or by any other relevant criteria. Specifically, instructors and course developers may search for content previously associated with a particular outcome in building course curriculum. As noted above, learning outcomes may be associated with content items during the authoring modes of creating, editing, or adding content items within a course or unit or anytime thereafter. Users may mix standard learning outcomes with custom outcomes within a course. Users may be allowed to change the display name of a learning outcome within a given course.

The selected learning outcome is then associated with various learning and/or assessment content items (step 204) or course nodes. Alternatively, the learning outcome may be associated substantially simultaneously with the initial creation of the content, i.e., during the content authoring process in the content manager system. During content creation, the content author or other user may choose to defer the association of the content with a learning outcome until a later time. Association of selected learning outcomes with selected content items may be accomplished by populating content metadata with an indicator of the selected learning outcome. The metadata fields may be populated from a standardized or custom set of learning outcomes. For example, a user may select a learning outcome and/or content items from pre-populated selection lists to associate a content item with the selected learning outcome.

Learning content associated with a selected learning outcome is presented to a student (step 206) as part of participation in an on-line course. Assessment content is then presented to the student (step 208) to determine mastery of the learning content or learning outcome associated with the assessment content. Content may be presented in any suitable manner to enable a student to obtain or demonstrate a given learning outcome. For example, a student may be presented a video or text lecture addressing a stated learning outcome for the course. The student then participates in an assessment activity such as an on-line exam where the individual questions within the exam are associated with a specific learning outcome(s). Student performance is thus evaluated based on mastery of the learning outcome.

In various embodiments, it may be advantageous to record the time spent (step 210) by the student in accessing or responding to presented learning and/or assessment content. For example, recorded time data facilitate increased understanding of performance patterns and trends as a function of the time spent in association with a given content item or learning outcome. Administrators may request more detailed learning outcome data such as the amount of time students spent on particular content items associated with a learning outcome and the percent mastery of that learning outcome. This enables educators to better predict, track, and report the time required for adequate mastery of a learning outcome. For example, instructors may assess the correlation between mastery or retention of learning outcomes and the time spent studying related content.

The present invention allows institutions to compare and analyze student performance based on multiple temporal factors, including, for example, the amount of time spent relative to various learning and/or assessment content items, the amount of time spent relative to various learning outcomes, and the amount time spent by an instructor preparing course materials, grading student materials, and facilitating class interactions. This temporal data facilitates informed decision-making about best instructional practices and procedures for program improvement. The effects of these best instructional practices and procedures may then be evaluated in accordance with the present invention.

The present invention allows institutions to analyze student performance relative to various learning outcomes over time by storing data such as the amount of time spent on learning activities and the grades received in a data warehouse for an extended period of time, or indefinitely. Various versions of content items may likewise be stored indefinitely to provide a complete record of student activity. In one embodiment, user activity is tracked in terms of minutes rather than "page hits," to provide increased accuracy as to the usage of various content items and course tools within the course. Organization and retention of such historic data allows institutions to compare student performance over time and to identify factors that contribute to changes in student performance.

The LOM facilitates evaluation of student performance (step 212) relative to given learning outcomes. Evaluation may be automatically performed by the LOM, as with objective grading of multiple choice responses. Alternatively, an instructor may manually evaluate a student performance, such as an essay or skills demonstration and then enter the performance into an electronic gradebook, from which LOM will import the data. In instances where multiple outcomes are associated with a given assessment content item (e.g., a paper or project), the LOM facilitates measurement of performance relative to each of the learning outcomes. This may be accomplished using a rubric that breaks the content down into measurable requirements or elements associated with individual learning outcomes. Thus, multiple measurable scores may be assigned to a single performance relative to multiple learning outcomes. As discussed in more detail below, the rubric, learning outcomes, and associated scores may be displayed in various student and instructor interface views, for example, within an electronic grade book.

Various LOM embodiments include adaptive learning features to facilitate presentation of remedial content (step 214) in response a performance or response to assessment content. For example, the LOM may automatically display additional content to a student who demonstrates less than 60% mastery of a given learning outcome based on performance in response to any number of assessment content items. Remedial content may be displayed based on mastery of any given level of outcomes within a course or program outcome hierarchy. Remedial content may be displayed up to any number of preset times or until a student adequately performs a target learning outcome. Alternatively, additional assessment content may be presented to the student without remedial learning content to provided additional or alternative opportunities to demonstrate mastery of a learning outcome. The LOM may thus facilitate adaptive learning by automatically providing students with appropriate remedial content after a student has failed to demonstrate mastery of a given learning outcome.

A student "summary" screen showing the learning outcomes and the questions addressed in an exam provides the student with the percentage mastery that he or she achieved for each learning outcome. The screen may provide the student with access to supplemental materials that are associated with specific learning outcomes that the student did not sufficiently master. Remedial content may be generated from the school's local content repository or from remote publisher materials.

The LOM system then generates a learning outcome report (step 216) based on preset parameters or based on a user's ad hoc query. Reporting may be accomplished, for example, by email or posting to a secure web-page and may be deployed manually or automatically according to a preset schedule. Email functionalities may be incorporated into the LOM system or may be performed by a networked email engine or server. Any known or later developed email feature may be offered in conjunction with the present invention.

In various embodiments, the LOM provides reporting at the student, course, and program levels. Aggregate performance data is useful in identifying deficient content areas, effective teaching tools, and relative teaching strengths and weakness of different instructors, courses, or programs.

At the student level, the LOM measures and reports student performance per learning outcome. A student level report may indicate, for example, that student Jane Doe did not master learning outcome 3.1 in unit 3 or that Jane Doe mastered 90% of the stated learning objectives in BUS405.

At the course level, the LOM facilitates assessment of the performance of an entire class. An exemplary course-level report may indicate that all students in BUS400 demonstrate a 90% mastery of learning outcomes. Course-level reports may also enable institutions to view which courses are addressing which learning outcomes.

Another exemplary course-level LOM report facilitates assessment of instructor performance through comparison of aggregate student performance per learning outcome between courses taught by two different instructors. An exemplary course-level report may indicate that instructors A and B both teach the same unit or section of course X, and that A's students showed a mastery of 80% of the learning outcomes while B's only showed mastery in 50%.

Yet another exemplary course-level LOM report facilitates identification of weaker content areas. For example, an LOM report may indicate that only 20% of the students in a class mastered Learning Outcome #8, while 100% demonstrated mastery of the remaining Learning Outcomes. An instructor may then associate additional learning content with Learning Outcome #8 to bolster student mastery.

An exemplary program-level LOM report enables administrators and instructors to analyze and predict program-level outcomes. Instructors and administrators may continuously or periodically track how well content and student performance correlate with learning outcomes. Periodic LOM reports may be generated to enable instructors and administrators to monitor improvement over time. The reporting feature allows an institution to show accreditation agencies that it is monitoring results and improving its curricula based on these results.

In addition to evaluating individual student performance in a course relative to a particular learning outcome, instructors and administrators may compare various students' performance relative to a particular learning outcome or content item. It should be understood that an instructor or administrator may select any number of students, classes, and/or courses for evaluation and/or reporting relative to a particular learning outcome. The LOM report may include any relevant information such as, for example, a student's name, identification of a selected learning outcome, identification of course content associated with the selected learning outcome, indication of a score awarded relative to assessment content, and an indication of the time spent by a student relative to a particular content item.

In an exemplary course-level reporting scenario, an administrator generates reports in the LOM that demonstrate how effectively an instructor is teaching certain learning outcomes. For example, an administrator may select one or more instructors and/or one or more common courses, course units, or content items. The LOM generates a report displaying information such as: the instructors being compared, an indication of the selected course, course unit, or content items and associated learning outcomes, and an indication (e.g., percentage) of students in the course that demonstrated adequate fulfillment of certain learning outcomes (i.e., that correctly responded to given assessment content items).

In another exemplary course-level reporting scenario, the LOM facilitates identification of content weaknesses or learning outcomes that are not being taught effectively within a course. An administrator or instructor selects a course or course unit and/or desired learning outcomes. The LOM then generates a report displaying information such as, for example, selected learning outcomes associated with the course, content associated with those outcomes, a percentage of students in that course that responded correctly to assessment content for a given learning outcome. This enables instructors to perform "gap analysis" or to identify those learning outcomes and content items that are not adequately covered in the course.

In the event that multiple assessment questions address a single learning outcome, an instructor may establish a calculation or basis to be used by the LOM to determine mastery of selected learning outcomes. For example, an instructor may configure the LOM to measure mastery or achievement as a percentage of correct answers. The instructor may also enter a passing percentage score that reflects a minimum acceptable mastery level. Thus, content or student data may be reported based on established mastery or passing percentages.

Similarly, course-level reporting may be periodically performed to track how student mastery of a learning outcome within a course has changed over time. For example, a user may select a time period and at least one learning outcome for reporting. The LOM generates a report displaying information such as, for example, a selected learning outcome and a percent mastery of the learning outcome for the selected time frame (e.g., for two separate semesters).

In an embodiment, a survey feature allows students to indicate their own perceived mastery or measure of performance relative to learning outcomes. Comparison of actual versus perceived performance may enable instructors to better tailor course content to individuals in a timely manner.

The LOM facilitates quantifying higher-level, abstract learning outcomes as a function of lower-level, more readily measurable learning outcomes. For example, an abstract intended program-level outcome such as "critical thinking" or "technical research skills" may not be adequately reflected by any given assessment content item, but should instead be measured as a composite of many related or overlapping learning outcomes. Instructors and administrators may thus use outcome hierarchies as the basis for generating aggregate learning outcome reports to quantify top-level outcomes. Accordingly, the LOM may be used to analyze student mastery of learning outcomes over time and at any level of a learning outcome hierarchy in relationship to any relevant metric. The LOM allows users to leverage content associated with learning outcomes across multiple courses.

Figure 3:
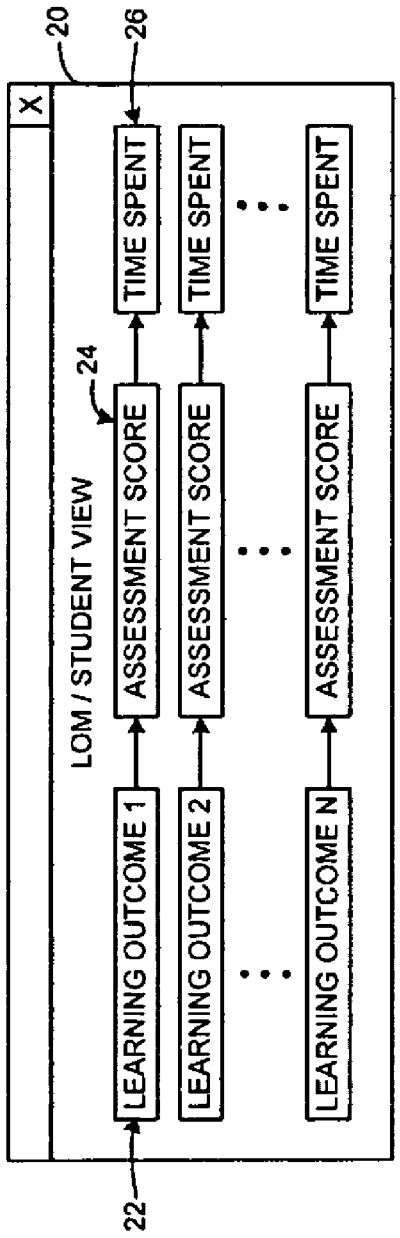
FIG. 3 illustrates an exemplary student view of an exemplary learning outcome report in accordance with the present invention.

FIG. 3 illustrates an exemplary student view 20 of an exemplary learning outcome report. Student view 20 includes an identification of the reported learning outcomes 22 within the on-line educational course and corresponding composite assessment scores 24 awarded for performance relative to each outcome. The student may optionally be presented with time data 26 indicating the time spent relative to learning outcomes 22. Time data 26 may be further listed according to corresponding learning and/or assessment content. Learning outcome reports may be displayed within an electronic grade book similar to that disclosed in application Ser. No. 60/601, 350, which is incorporated herein by reference in its entirety.

Figure 4:
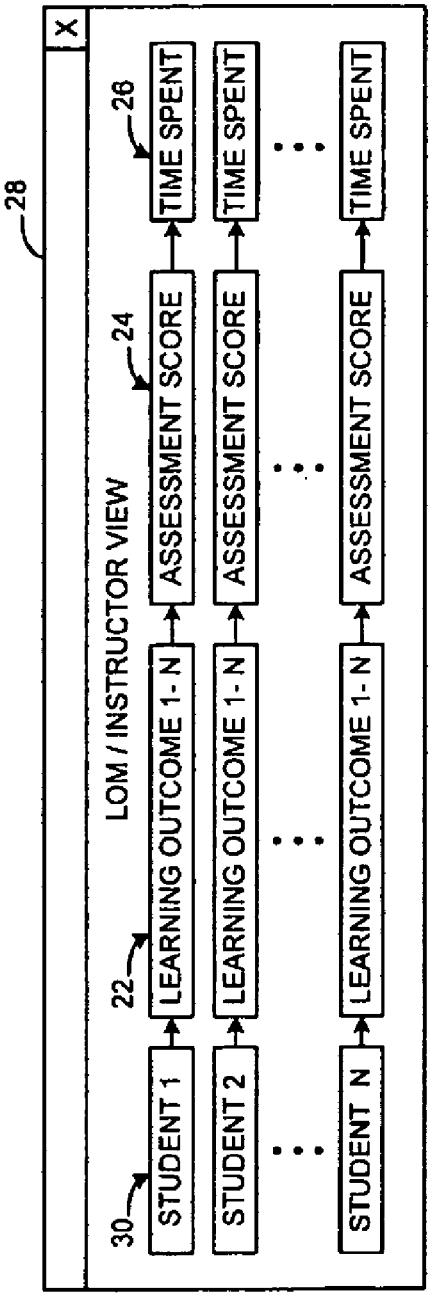
FIG. 4 illustrates an exemplary instructor view of an exemplary learning outcome report in accordance with the present invention.

FIG. 4 illustrates an exemplary instructor view 28 of an exemplary learning outcome report displaying an identification of the students 30 in a course, reported learning outcomes 22 for the course, and corresponding assessment scores 24. Instructor view 28 may also include time data 26 or any other relevant record of student activity corresponding to learning outcomes 22. For example, the learning outcome report may also include an indication of access and submission dates and times and of the duration of access to various content items or course areas. Suitable student views 20 or instructor views 28 may be displayed at any stage of the LOM process.

Figure 5:
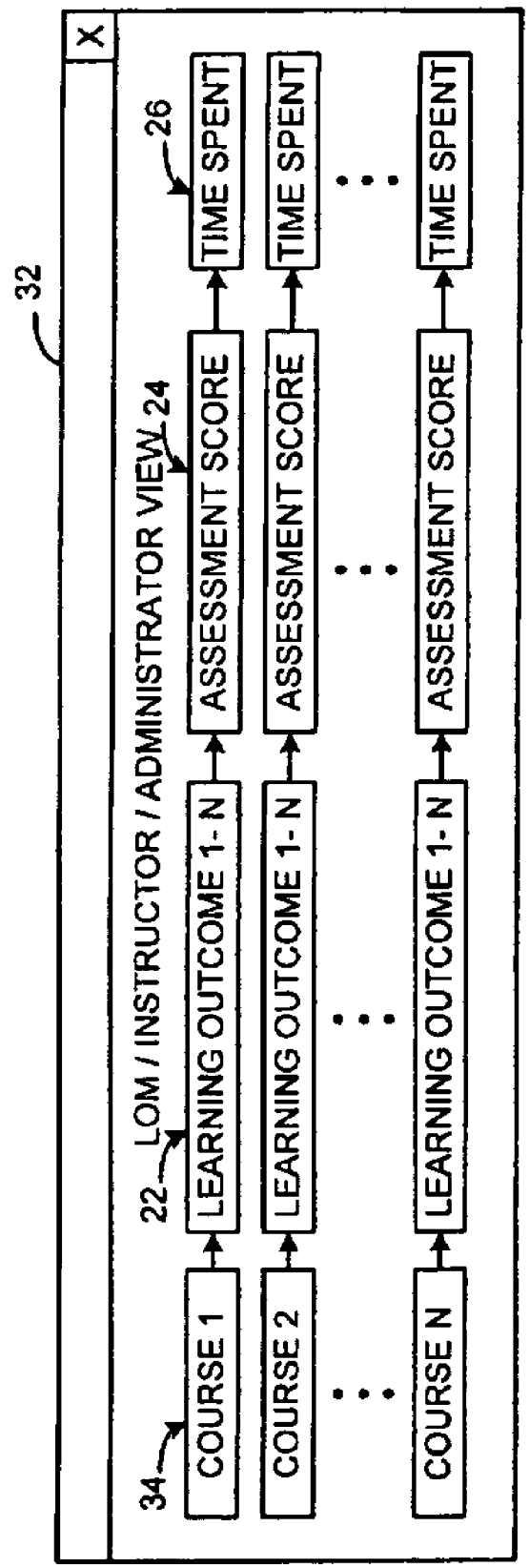
FIG. 5 illustrates an exemplary instructor view of an exemplary learning outcome report in accordance with the present invention.

FIG. 5 illustrates an exemplary instructor/administrator view 32 of an exemplary learning outcome report displaying an aggregate identifier 34 of a group of students, reported learning outcomes 22, and corresponding aggregate assessment scores 24. Instructor/administrator view 32 may also include an indicator of the aggregate or average time spent 26 or any other relevant record of student activity relative to learning outcomes 22. Aggregate identifier 34 may represent a class, course, section, program, or any other relevant group of students useful in evaluating aggregate student performance over time or between groups based on any relevant criteria such as time spent. In one embodiment, for example, instructor/administrator view 32 enables instructors or administrators to assess how a group of students performed relative to Objective 3 in the Fall 2005 course compared to the Fall 2004 course. Such comparisons are useful, for example, in tracking the progress of an instructor's teaching effectiveness or that of a program as a whole over time.

The LOM may be used to generate a detailed transcript allowing administrators or employers to see how students or applicants performed in individual skill and knowledge sets rather than merely in courses as a whole. Similarly, in various embodiments, the LOM includes a portfolio feature providing users with a digital collection of student work that may be used to demonstrate a student's mastery of learning objectives. For example, students or instructors may select various content items and student work product for inclusion in a course portfolio. Portfolios may be accessed by employers seeking to gauge an applicant's mastery of specific desired skill sets or other learning outcomes.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements. All structural and functional equivalents to the elements of the above-described exemplary embodiments that are known to those of ordinary skill in the art are expressly incorporated herein by reference. Moreover, it is not necessary for a device or method to address each and every problem sought to be solved by the present invention. Further, no element described herein is required for the practice of the invention unless expressly described as "essential" or "critical."

What is claimed is:

1. A course management system configured to evaluate an effectiveness of learning content in an online educational course, said system comprising:
   a tangible, non-transitory memory communicating with a processor;
   a learning outcome to be effected through student participation in said course and through exposure to a learning content item, wherein said learning outcome is part of a plurality of learning outcomes, wherein said learning content item is a part of a plurality of learning content items;
   an electronic learning outcome indicator associated, via learning outcome metadata, with said learning outcome and said learning content item, wherein said electronic learning outcome indicator is created by transforming said plurality of learning outcomes relating to a learning content item into said electronic learning outcome indicator, wherein said learning content item is configured to be displayed to a student;
   an assessment content item associated with said learning outcome and said learning content item, wherein said assessment content item is part of a plurality of assessment content items, wherein said assessment content item comprises at least one of an assignment, exam, quiz, skill test, journal entry, and a threaded discussion, wherein said exam comprises a plurality of questions and wherein a question in said plurality of questions is associated with said learning outcome;
   said learning outcome, said learning content item and said assessment content item associated via metadata with student temporal data regarding student activity, wherein said student activity comprises at least one of time spent by student on said learning outcome, time spent by said student on said learning content item, and wherein said student temporal data is tracked automatically by the system;
   said learning outcome, said learning content item and said assessment content item each associated, via metadata, with instructor temporal data regarding an instructor activity, wherein said instructor activity comprises at least one of amount of time spent preparing said learning content item, amount of time spent grading and amount of time spent facilitating class interactions, and wherein said instructor temporal data is tracked automatically by the system;
   a performance indicator of said student performance relative to said assessment content item, said performance indicator used to assess said effectiveness of said learning content item relative to said learning outcome, and wherein said performance indicator comprises i) a first aggregate indicator of said effectiveness of said learning content item and ii) a rubric with multiple scores associated with multiple learning outcomes; and
   a report generating scheme for generating a report that compares performance of instructors, wherein generating said report comprises selection of instructors to be compared and one or more common learning content items.

2. The system of claim 1, further comprising at least one of a remedial learning content item and a remedial assessment content item for automatic display to said student if said performance indicator indicates a deficiency relative to said learning outcome.

3. The system of claim 2, further comprising a periodic plurality of said performance indicators relative to said learning outcome.

4. The system of claim 3, further comprising a survey feature for self-evaluation by said student relative to said learning outcome.

5. The system of claim 4, further comprising a second aggregate indicator of the effectiveness of a second learning content item, wherein said second learning content item is a part of the plurality of learning content items and is associated with said electronic learning outcome indicator.

6. The system of claim 5, wherein at least one of said learning content item and said assessment content item is associated with a plurality of learning outcomes.

7. The system of claim 6, wherein each learning content item in said plurality of learning content items are associated with a first content item metric, wherein said first content item metric comprises an indication of time spent by said student on said learning content item relative to said learning outcome.

8. A computer-implemented method to evaluate an effectiveness of learning content in an on-line course comprising:
   receiving, by a computer for evaluating the effectiveness of the learning content, a selection of a learning outcome to be effected through student participation in a course and through exposure to a learning content item, wherein said learning outcome is part of a plurality of learning outcomes;
   transforming, by said computer, said plurality of learning outcomes relating to said learning content item to create an electronic learning outcome indicator, wherein said learning content item is part of a plurality of learning content items;
   associating, by said computer, said electronic learning outcome indicator with said learning outcome;
   associating, by said computer, said electronic learning outcome indicator with an assessment content item, wherein said assessment content item is part of a plurality of assessment content items, and wherein said assessment content item is associated with said learning outcome and said learning content item, wherein said assessment content item is part of a plurality of assessment content items associated with said learning content item, wherein said assessment content item comprises at least one of an assignment, exam, quiz, skill teat, journal entry, and a threaded discussion, wherein the exam comprises a plurality of questions and wherein a question in the plurality of questions is associated with said learning outcome;

automatically tracking, by said computer, student temporal data;

associating, by said computer and via metadata, said learning outcome, said learning content item and said assessment content item with said student temporal data regarding student activity, wherein said student activity comprises at least one of time spent by student on the learning outcome, time spent by said student on said learning content item;

automatically tracking, by said computer, instructor temporal data;

associating, by said computer and via metadata, said learning outcome, said learning content item and said assessment content item with said instructor temporal data regarding instructor activity, wherein said instructor activity comprises at least one of amount of time spent preparing the learning content item, amount of time spent grading and amount of time spent facilitating class interactions;

presenting, by said computer, said learning content item to said student;

presenting, by said computer, said assessment content item to said student;

recording, by said computer, a performance by said student in response to said assessment content item;

creating, by said computer, a performance indicator of said student performance relative to said assessment content item, said performance indicator used to assess the effectiveness of said learning content item relative to said learning outcome, and wherein said performance indicator comprises i) a first aggregate indicator of the effectiveness of said learning content item and ii) a rubric with multiple scores associated with multiple learning outcomes; and a report generating scheme for generating a report that compares performance of instructors, wherein generating said report comprises selection of instructors to be compared and one or more common learning content items.

9. The method of claim 8, further comprising tracking a first metric associated with said learning outcome, wherein said tracking said first metric comprises recording an amount of time spent by said student in association with said at least one of a learning content item and an assessment content item relative to said learning outcome.

10. The method of claim 9, wherein said receiving a selection of a learning outcome comprises receiving a selection of at least one of comprehension of a standardized instructional content item, acquisition of a standardized skill, knowledge of a course content item, and mastery of a standardized learning outcome.

11. The method of claim 10, wherein of associating said electronic learning outcome indicator comprises populating metadata associated with at least one of said learning content item and said assessment content item with said electronic learning outcome indicator.

12. The method of claim 11, wherein generating said report comprises generating periodic reports of said performance indicator relative to said learning outcome to facilitate tracking of said performance over time.

13. The method of claim 11, wherein generating said report comprises: aggregating a plurality of performance indicators to determine aggregate performance data relative to at least one of a class, course, course section, program, professor, and school and generating said report based upon said aggregate performance data.

14. The method of claim 13, wherein generating said report is performed in response to a user's query relative to at least one of said learning outcome, said student performance, said learning content item, and said assessment content item.

15. The method of claim 14, wherein said learning content item is at least one of a lecture, outline, exercise, text, field trip, threaded discussion, and interactive instruction.

16. The method of claim 15, wherein generating said report further comprises aggregating a plurality of performance indicators for at least two groups of students relative to said learning content item to facilitate evaluation of said learning content item's effectiveness relative to said learning outcome.

17. The method of claim 16, wherein generating said report further comprises providing at least one of said plurality of performance indicators, electronic learning outcome indicator, an identification of at least one of said instructors, an identification of at least one of said groups of students, an identification of said learning content item, an indemnification of said assessment content item, an indication of a score awarded to said student relative to said assessment content item, and an indication of an amount of time spent by said student relative to said learning outcome.

18. The method of claim 17, wherein said generating said report further comprises aggregating said performance indicator for plurality of students relative to said learning outcome to facilitate identification of deficient course content items associated with said learning outcome.

19. The method of claim 18, wherein associating said electronic learning outcome indicator comprises synchronizing said electronic learning outcome indicator with a learning outcome standards database and re-associating said electronic learning outcome indicator with at least one of said learning content item and said assessment content item.

20. The method of claim 19, wherein associating said electronic learning outcome indicator substantially coincides with a creation of at least one of said learning content item and said assessment content item.

21. The method of claim 20, further comprising associating a second electronic learning outcome indicator with at least one of said learning content item and said assessment content item, said second electronic learning outcome indicator representing a second learning outcome.

22. The method of claim 21, wherein generating said report further comprises providing at least one of an indication of said student, said electronic learning outcome indicator, an identification of at least one of said learning content item and said assessment content item, an indication of a score awarded to said student relative to said assessment content item, and an indication of an amount of time spent by a student relative to at least one of said learning outcome, said learning content item, and said assessment content item.

23. The method of claim 22, wherein generating said report of said performance comprises indicating whether said performance satisfies a minimum passing proficiency relative to said learning outcome.

24. The method of claim 23, further comprising providing a self-evaluation survey to a user relative to said learning outcome.

25. A non-transitory computer-readable storage medium embodying a plurality of instructions, said plurality of instructions, when executed by a computer for evaluating an effectiveness of learning content, cause said computer to perform a method comprising:

receiving, by said computer, a selection of a learning outcome to be effected through student participation in a course and through exposure to a learning content item, wherein said learning outcome is part of a plurality of learning outcomes;

transforming, by said computer, said plurality of learning outcomes relating to a learning content item to create an electronic learning outcome indicator, wherein said learning content item is part of a plurality of learning content items;

associating, by said computer, said electronic earning outcome indicator with said learning outcome;

associating, by said computer, said electronic learning outcome indicator with an assessment content item, wherein said assessment content item is part of a plurality of assessment content items, and wherein said assessment content item is associated with said learning outcome and said learning content item, wherein said assessment content item is part of a plurality of assessment content items associated with said learning content item, wherein said assessment content item comprises at least one of an assignment, exam, quiz, skill test, journal entry, and a threaded discussion, wherein the exam comprises a plurality of questions and wherein a question in the plurality of questions is associated with the learning outcome;

automatically tracking, by said computer, student temporal data;

associating, by said computer and via metadata, said learning outcome, said learning content item and said assessment content item with said student temporal data regarding student activity, wherein the student activity comprises at least one of time spent by student on the learning outcome, time spent by the student on the learning content item;

automatically tracking, by said computer, instructor temporal data;

associating, by said computer and via metadata, said learning outcome, said learning content item and said assessment content item with said instructor temporal data regarding an instructor activity, wherein the instructor activity comprises at least one of amount of time spent preparing the learning content item, amount of time spent grading and amount of time spent facilitating class interactions;

presenting, by said computer, said learning content item to said student;

presenting, by said computer, said assessment content item to said student;

recording, by said computer, a performance by said student in response to said assessment content item;

creating, by said computer, a performance indicator of said student performance relative to said assessment content item, said performance indicator used to assess the effectiveness of said learning content item relative to said learning outcome, and wherein said performance indicator comprises i) a first aggregate indicator of the effectiveness of said learning content item and ii) a rubric with multiple scores associated with multiple learning outcomes; and a report generating scheme for generating a report that compares performance of instructors, wherein generating said report comprises selection of instructors to be compared and one or more common learning content items.

26. The system of claim 1, wherein each assessment content item in said plurality of assessment content items are associated with a second content item metric indicating time spent by said student on said assessment content item relative to said learning outcome.

27. The method of claim 8, further comprising tracking a second metric associated with said assessment content item wherein said tracking said second metric comprises recording an amount of time spent by said student in association with said assessment content item relative to said learning outcome.

* * * * *

UNITED STATES PATENT AND TRADEMARK OFFICE
CERTIFICATE OF CORRECTION

PATENT NO. : 8,380,121 B2
APPLICATION NO. : 11/160487
DATED : February 19, 2013
INVENTOR(S) : Sarah Bradford et al.

It is certified that error appears in the above-identified patent and that said Letters Patent is hereby corrected as shown below:

In Column 17 Line 64, after "wherein" please delete "of".

Signed and Sealed this
Ninth Day of April, 2013

Teresa Stanek Rea
*Acting Director of the United States Patent and Trademark Office*